US012696252B2

(12) United States Patent
Davydov et al.

(10) Patent No.: US 12,696,252 B2
(45) Date of Patent: Jul. 28, 2026

(54) TECHNIQUES FOR CHANNEL STATE INFORMATION REFERENCE SIGNAL (CSI-RS) TRANSMISSION

(71) Applicant: Intel Corporation, Santa Clara, CA (US)

(72) Inventors: Alexei Davydov, Nizhny Novgorod (RU); Dmitry Dikarev, Nizhny Novgorod (RU); Yingyang Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 380 days.

(21) Appl. No.: 18/549,152

(22) PCT Filed: Apr. 4, 2022

(86) PCT No.: PCT/US2022/023338
§ 371 (c)(1),
(2) Date: Sep. 5, 2023

(87) PCT Pub. No.: WO2022/216620
PCT Pub. Date: Oct. 13, 2022

(65) Prior Publication Data
US 2024/0155589 A1     May 9, 2024

Related U.S. Application Data

(60) Provisional application No. 63/171,019, filed on Apr. 5, 2021.

(51) Int. Cl.
*H04W 72/04* (2023.01)
*H04B 7/06* (2006.01)
(Continued)

(52) U.S. Cl.
CPC ...... *H04W 72/0453* (2013.01); *H04B 7/0626* (2013.01); *H04L 5/1469* (2013.01);
(Continued)

(58) Field of Classification Search
CPC ......... H04W 72/0453; H04W 72/0446; H04W 72/12; H04W 72/232; H04L 5/1469;
(Continued)

(56) References Cited

U.S. PATENT DOCUMENTS

2014/0294107 A1  10/2014  Shin
2019/0052443 A1   2/2019  Cheng et al.
(Continued)

FOREIGN PATENT DOCUMENTS

WO  WO-2020069135 A2 *  4/2020  ........... H04L 5/0092

OTHER PUBLICATIONS

International Patent Office—International Search Report and Written Opinion mailed Jul. 28, 2022 from International Patent Application No. PCT/US2022/023338, 11 pages.
(Continued)

*Primary Examiner* — Lan-Huong Truong
(74) *Attorney, Agent, or Firm* — Gray Ice Higdon, PLLC

(57) ABSTRACT

Various embodiments provide techniques for channel state information reference signal (CSI-RS) transmission in a wireless cellular network. CSI-RS transmission bandwidth is determined based on a frequency domain allocation of a physical downlink shared channel (PDSCH), a physical uplink shared channel (PUSCH), or a physical downlink control channel (PDCCH). A user equipment (UE) receives the CSI-RS according to the frequency domain allocation and a time domain allocation.

20 Claims, 8 Drawing Sheets

700 determining a frequency domain allocation for a CSI-RS based on a resource allocation of at least one of a PDSCH, a PUSCH, or a PDCCH
702 receiving a downlink control information (DCI) that includes an indication of a time domain allocation for the CSI-RS
704 receiving the CSI-RS according to the frequency domain allocation and the time domain allocation
706

(51) Int. Cl.

| | |
|---|---|
| *H04L 5/14* | (2006.01) |
| *H04W 72/0446* | (2023.01) |
| *H04W 72/0453* | (2023.01) |
| *H04W 72/12* | (2023.01) |
| *H04W 72/232* | (2023.01) |

(52) U.S. Cl.
    CPC ....... *H04W 72/0446* (2013.01); *H04W 72/12*
              (2013.01); *H04W 72/232* (2023.01)

(58) Field of Classification Search
    CPC ... H04L 5/0053; H04L 5/0091; H04L 5/0048;
              H04L 5/14; H04L 5/005; H04B 7/0626
    See application file for complete search history.

(56) References Cited

U.S. PATENT DOCUMENTS

| | | | |
|---|---|---|---|
| 2019/0058517 A1 | 2/2019 | Kang et al. | |
| 2019/0341974 A1* | 11/2019 | Kim | H04W 72/542 |
| 2020/0076650 A1 | 3/2020 | Park et al. | |
| 2021/0014879 A1* | 1/2021 | Bae | H04L 27/2607 |
| 2022/0026517 A1* | 1/2022 | Hasegawa | G01S 5/0236 |
| 2023/0111063 A1* | 4/2023 | Ji | H04L 5/0012 |
| | | | 370/329 |
| 2023/0379966 A1* | 11/2023 | Nogami | H04W 72/231 |

OTHER PUBLICATIONS

LG Electronics, "On CSI-RS design for CSI acquisition," 3GPP TSG RAN WG1 Meeting #89, R1-1707613, Agenda item: 7.1.2.4.1, May 15-19, 2017, Hangzhou, P.R. China, 5 pages.

* cited by examiner (4,1)

(2,2)

(2,1)

700 determining a frequency domain allocation for a CSI-RS based on a resource allocation of at least one of a PDSCH, a PUSCH, or a PDCCH
702 receiving a downlink control information (DCI) that includes an indication of a time domain allocation for the CSI-RS
704 receiving the CSI-RS according to the frequency domain allocation and the time domain allocation
706

800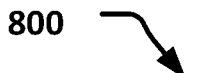

encoding a DCI for transmission to a UE in a PDCCH, wherein the DCI includes an indication of a time domain allocation for a CSI-RS
802 determining a frequency domain allocation for the CSI-RS based on a resource allocation of at least one of a PDSCH, a PUSCH, or the PDCCH
804 encoding the CSI-RS for transmission to the UE according to the frequency domain allocation and the time domain allocation
806

Figure 8

TECHNIQUES FOR CHANNEL STATE INFORMATION REFERENCE SIGNAL (CSI-RS) TRANSMISSION

CROSS REFERENCE TO RELATED APPLICATION

The present application is a national phase entry under 35 U.S.C. § 371 of International Application No. PCT/US2022/023338, filed Apr. 4, 2022, entitled "TECHNIQUES FOR CHANNEL STATE INFORMATION REFERENCE SIGNAL (CSI-RS) TRANSMISSION," which claims priority to U.S. Provisional Patent Application No. 63/171,019, which was filed Apr. 5, 2021, the entire disclosures of which are hereby incorporated by reference.

FIELD

Various embodiments generally may relate to the field of wireless communications. For example, some embodiments may relate to techniques for channel state information reference signal (CSI-RS) transmission.

BACKGROUND

3GPP New Radio (NR) includes CSI-RSs to support channel measurements for channel state information (CSI) reporting and beam management (BM) reporting. NR supports three types of CSI-RS transmission—periodic, semi-persistent, and aperiodic. Periodic CSI-RS is configured by radio resource control (RRC) signaling and periodically transmitted by the next generation Node B (gNB). Semi-persistent CSI-RS is also configured by RRC, but its periodic transmission is activated by medium access control (MAC) signaling. Aperiodic CSI-RS is triggered by downlink control information (DCI) and limited to one or several CSI-RS transmission occasions. Aperiodic CSI-RS is triggered by DCI formats 0_1 and 0_2 in a user equipment (UE)-specific manner. CSI-RS frequency domain allocation is configured by higher layers.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 8 depicts another example procedure for practicing the various embodiments discussed herein.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques to improve CSI-RS transmission. For example, embodiments may include one or more of the following aspects of CSI-RS:

Determination of CSI-RS bandwidth based on one or more of physical downlink shared channel (PDSCH), physical uplink shared channel (PUSCH), and/or physical downlink control channel (PDCCH) bandwidth Zero power CSI-RS Pre-emption indication for CSI-RS based on a code block bundle (CBB)

Additional demodulation reference signal (DM-RS) occasion after CSI-RS

Channel State Information Reference Signal (CSI-RS)

3GPP NR includes CSI-RS reference signals to support channel measurements for channel state information (CSI) reporting and beam management (BM) reporting. A CSI-RS resource includes one or many (See Table 1) basic units of size (Y, Z) adjacent elements, where Y is the number of sub-carriers and Z is the number of orthogonal frequency division multiplexing (OFDM) symbols.

TABLE 1

| | Supported combinations of the basic units and antenna port (AP) multiplexing for CSI-RS resource | | | |
|---|---|---|---|---|
| #AP | Density PRB | N, symb. | (Y, Z) | Multiplexing |
| 1 | 1, 1/2, 3 | 1 | N.A. | No CDM |
| 2 | 1, 1/2 | 1 | (2, 1) | FD-CDM2 |
| 4 | 1 | 1 | (4, 1) | FD-CDM2 |
| 8 | 1 | 1 | (2, 1) | FD-CDM2 |
| 8 | 1 | 2 | (2, 2) | FD-CDM2, CDM4(FD2, TD2) |
| 12 | 1 | 1 | (2, 1) | FD-CDM2 |
| 12 | 1 | 2 | (2, 2) | CDM4(FD2, TD2) |
| 16 | 1, 1/2 | 2 | (2, 2) | FD-CDM2, CDM4(FD2, TD2) |
| 24 | 1, 1/2 | 4 | (2, 2) | FD-CDM2, CDM4(FD2, TD2), CDM-8(FD2, TD4) (TD4 on adjacent symbols only) |
| 32 | 1, 1/2 | 4 | (2, 2) | FD-CDM2, CDM4(FD2, TD2), CDM-8(FD2, TD4) (TD4 on adjacent symbols only) |

3

Figure 1:
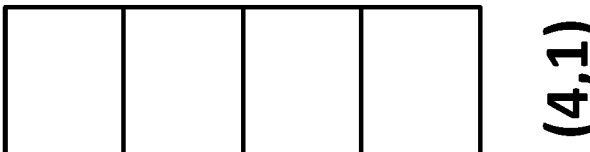
FIG. 1 illustrates basic resource units for channel state information reference signal (CSI-RS).
Figure 1:
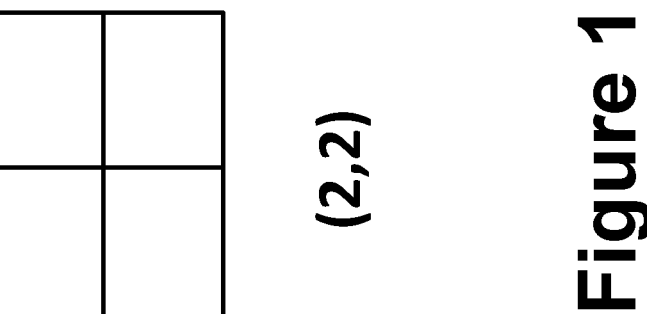

The basic resource units used for construction of CSI-RS resource are illustrated in FIG. 1. The resource units in the CSI-RS resource can be non-adjacent in the frequency domain.

As shown in Table 1, CSI-RS may occupy N=1, 2 or 4 OFDM symbol(s). If multiple symbols are used for CSI-RS transmission, the occupied resource elements (Res) are the same for all used OFDM symbols.

Various embodiments herein provide techniques to improve CSI-RS transmission. For example, embodiments may include one or more of the following aspects of CSI-RS:

Determination of CSI-RS bandwidth based on one or more of PDSCH, PUSCH, and/or physical downlink control channel (PDCCH) bandwidth Zero power CSI-RS Pre-emption indication for CSI-RS based on a code block bundle (CBB)

Additional DM-RS occasion after CSI-RS

Frequency Domain Allocation of CSI-RS:

In some embodiments, CSI-RS transmission bandwidth is determined based on the frequency domain allocation of PDSCH, PUSCH and/or PDCCH.

Figure 2:
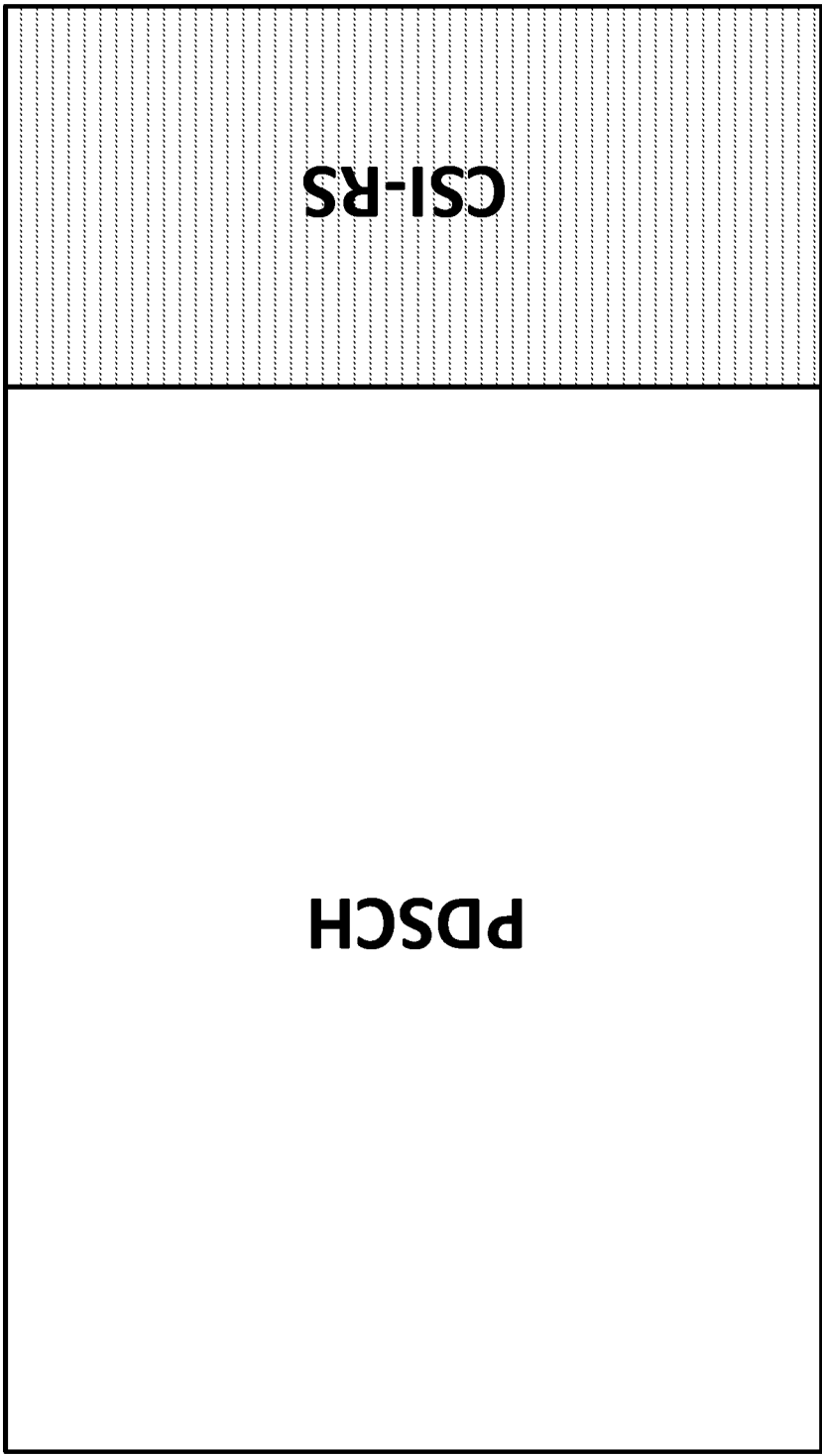
FIG. 2 illustrates CSI-RS frequency domain allocation in accordance with various embodiments herein.

In one example of this embodiment:

If PDSCH is scheduled by DCI, the CSI-RS frequency domain allocation is the same as frequency domain allocation of PDSCH indicated by DCI (see FIG. 2).

If PUSCH is scheduled, the CSI-RS frequency domain allocation is the same as PUSCH frequency domain allocation.

If PDCCH is transmitted without PDSCH and PUSCH, the CSI-RS resource allocation may be the frequency domain allocation of PDCCH, the frequency domain allocation of synchronization signal (SS)/physical broadcast channel (PBCH) (also referred to as synchronization signal block (SSB)), configured by higher layers, or pre-determined in the specification.

In another example, if PDSCH and PUSCH are scheduled, the CSI-RS frequency resource allocation may be the union of the PDSCH and PUSCH frequency domain allocations.

In another example, if PDSCH and PUSCH are scheduled the CSI-RS frequency domain allocation may be the union of the PDSCH, PUSCH and PDCCH frequency domain allocations.

In another example, if CSI-RS sequence size is not supported the target frequency domain allocation, the CSI-RS frequency domain allocation is determined as:

the closest possible frequency domain resource allocation within the target frequency domain allocation which can be supported by CSI-RS sequence; or the closest possible frequency resource allocation overlapping with the target frequency domain allocation which can be supported by CSI-RS sequence.

Zero-Power CSI-RS and Pre-Emption Indication:

In another embodiment, to accommodate CSI-RS transmission to a second UE, the first UE may be indicated with zero-power CSI-RS (or rate matching resource), where PDSCH is not transmitted to the first UE.

The frequency domain allocation of that zero power CSI-RS resource may be aligned with the PDSCH resource allocation.

The time-domain allocation of the zero power CSI-RS may be provided by offset indicated by DCI. The CSI-RS offset may additionally or alternatively include a pre-determined offset value configured by higher layers or pre-determined by specification. In some embodiments, the pre-determined CSI-RS offset may be determined by UE capability.

In other embodiments, CSI-RS for the second UE may be supported by puncturing of a code block bundle (CBB) and pre-emption indication of the CBB transmission in the next transmission of PDCCH. If the pre-emption of CBBs is indicated to the first UE, the first UE should assume that corresponding pre-empted CBBs are not transmitted.

Additional DM-RS

Figure 3:
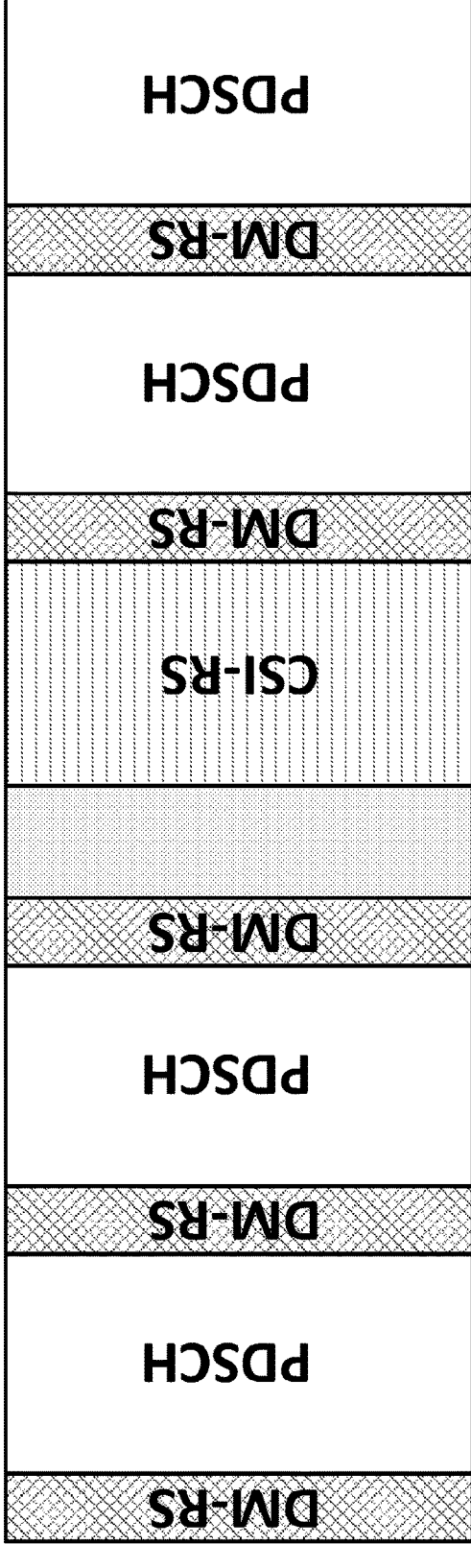
FIG. 3 illustrates an example of signal transmissions including an additional demodulation reference signal (DM-RS) transmitted after CSI-RS, in accordance with various embodiments.

In some embodiments, an additional DM-RS may be transmitted after CSI-RS to facilitate channel estimation at the UE after beam measurements. FIG. 3 illustrates an example of DM-RS transmitted after CSI-RS. The DM-RS may be transmitted directly after the CSI-RS (before any subsequent portion of the PDSCH or any other signal that the UE is expected to decode or transmit, whether or not there is a time gap between the CSI-RS and the DM-RS).

In other embodiments, CSI-RS (e.g., and subsequent DM-RS) may be transmitted at the end of the downlink (DL) portion of the time domain duplexing (TDD) period or at the end of the PDSCH allocation.

Systems and Implementations

Figure 4:
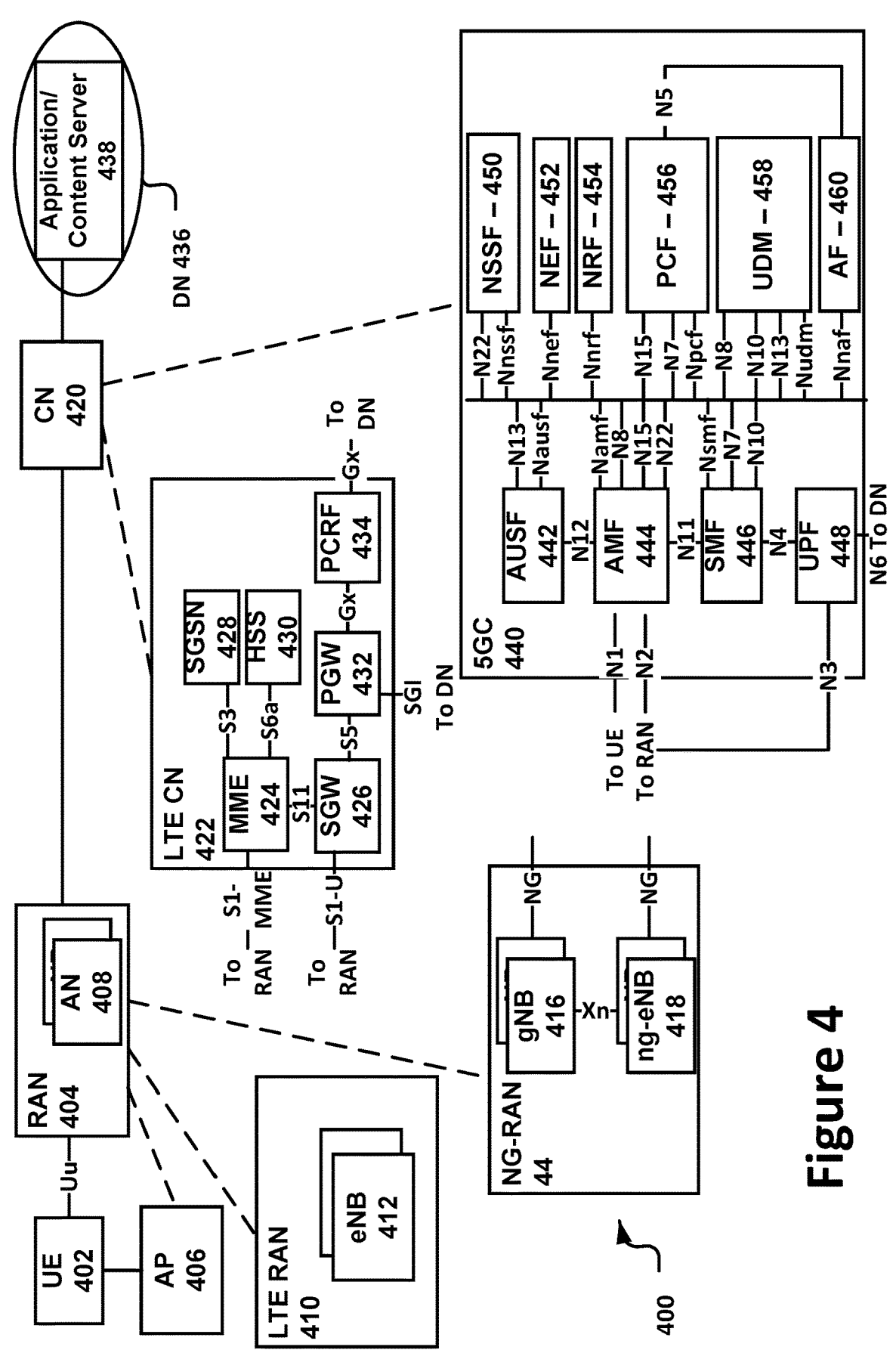
FIG. 4 schematically illustrates a wireless network in accordance with various embodiments.
Figure 5:
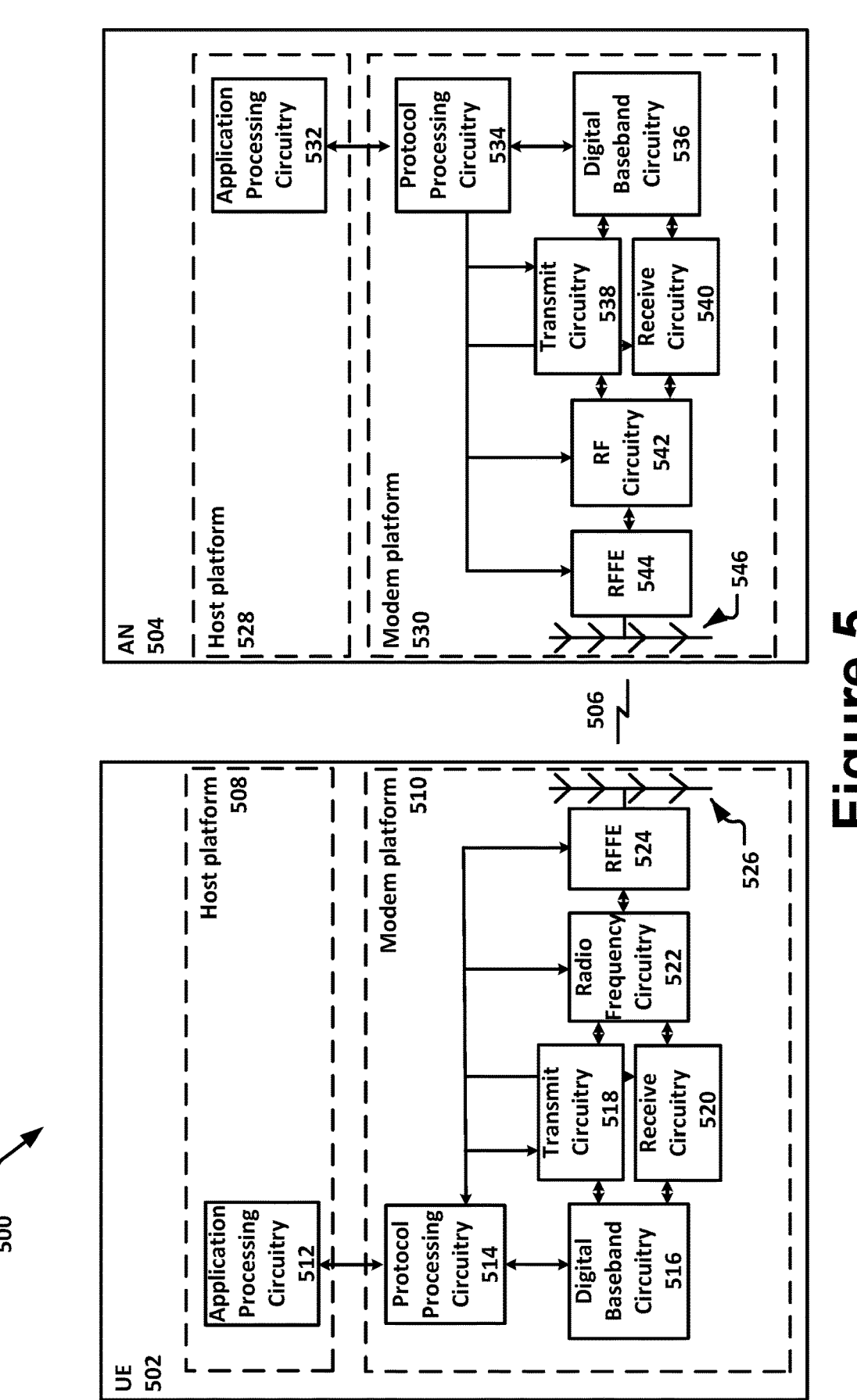
FIG. 5 schematically illustrates components of a wireless network in accordance with various embodiments.
Figure 6:
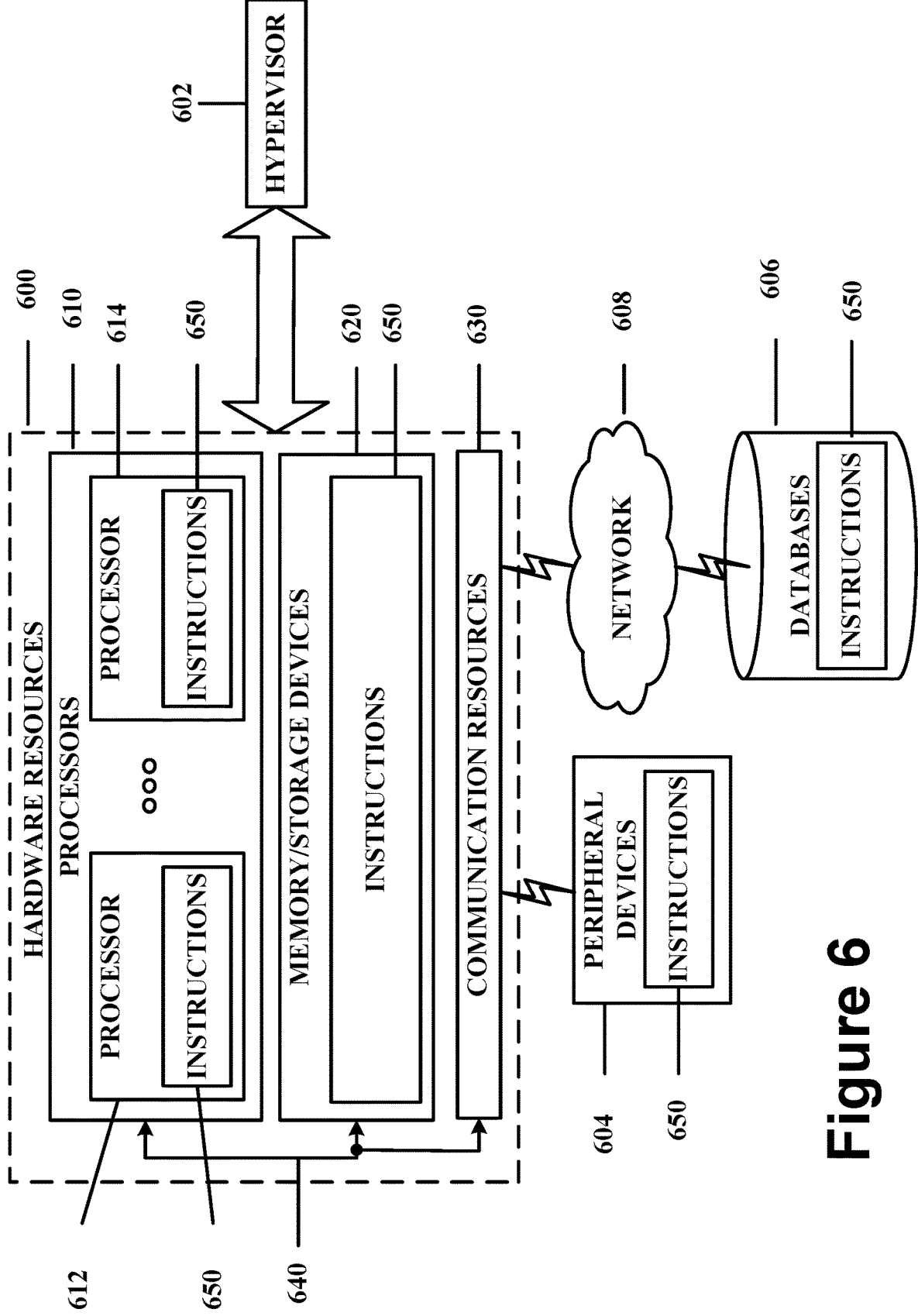
FIG. 6 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 4-6 illustrate various systems, devices, and components that may implement aspects of disclosed embodiments.

FIG. 4 illustrates a network 400 in accordance with various embodiments. The network 400 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 400 may include a UE 402, which may include any mobile or non-mobile computing device designed to communicate with a RAN 404 via an over-the-air connection. The UE 402 may be communicatively coupled with the RAN 404 by a Uu interface. The UE 402 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 400 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 402 may additionally communicate with an AP 406 via an over-the-air connection. The AP 406 may manage a WLAN connection, which may serve to offload some/all network traffic from the RAN 404. The connection between the UE 402 and the AP 406 may be consistent with any IEEE 802.11 protocol, wherein the AP 406 could be a wireless fidelity (Wi-Fi®) router. In some embodiments, the UE 402, RAN 404, and AP 406 may utilize cellular-WLAN aggregation (for example, LWA/LWIP). Cellular-WLAN aggregation may involve the UE 402 being configured by the RAN 404 to utilize both cellular radio resources and WLAN resources.

The RAN 404 may include one or more access nodes, for example, AN 408. AN 408 may terminate air-interface protocols for the UE 402 by providing access stratum protocols including RRC, PDCP, RLC, MAC, and L1 protocols. In this manner, the AN 408 may enable data/voice connectivity between CN 420 and the UE 402. In some embodiments, the AN 408 may be implemented in a discrete device or as one or more software entities running on server computers as part of, for example, a virtual network, which may be referred to as a CRAN or virtual baseband unit pool. The AN 408 be referred to as a BS, gNB, RAN node, eNB, ng-eNB, NodeB, RSU, TRxP, TRP, etc. The AN 408 may be a macrocell base station or a low power base station for providing femtocells, picocells or other like cells having smaller coverage areas, smaller user capacity, or higher bandwidth compared to macrocells.

In embodiments in which the RAN 404 includes a plurality of ANs, they may be coupled with one another via an X2 interface (if the RAN 404 is an LTE RAN) or an Xn interface (if the RAN 404 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 404 may each manage one or more cells, cell groups, component carriers, etc. to provide the UE 402 with an air interface for network access. The UE 402 may be simultaneously connected with a plurality of cells provided by the same or different ANs of the RAN 404. For example, the UE 402 and RAN 404 may use carrier aggregation to allow the UE 402 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 404 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 402 or AN 408 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 404 may be an LTE RAN 410 with eNBs, for example, eNB 412. The LTE RAN 410 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 404 may be an NG-RAN 414 with gNBs, for example, gNB 416, or ng-eNBs, for example, ng-eNB 418. The gNB 416 may connect with 5G-enabled UEs using a 5G NR interface. The gNB 416 may connect with a 5G core through an NG interface, which may include an N2 interface or an N3 interface. The ng-eNB 418 may also connect with the 5G core through an NG interface, but may connect with a UE via an LTE air interface. The gNB 416 and the ng-eNB 418 may connect with each other over an Xn interface.

In some embodiments, the NG interface may be split into two parts, an NG user plane (NG-U) interface, which carries traffic data between the nodes of the NG-RAN 414 and a UPF 448 (e.g., N3 interface), and an NG control plane (NG-C) interface, which is a signaling interface between the nodes of the NG-RAN 414 and an AMF 444 (e.g., N2 interface).

The NG-RAN 414 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 402 can be configured with multiple BWPs where each BWP configuration has a different SCS. When a BWP change is indicated to the UE 402, the SCS of the transmission is changed as well. Another use case example of BWP is related to power saving. In particular, multiple BWPs can be configured for the UE 402 with different amount of frequency resources (for example, PRBs) to support data transmission under different traffic loading scenarios. A BWP containing a smaller number of PRBs can be used for data transmission with small traffic load while allowing power saving at the UE 402 and in some cases at the gNB 416. A BWP containing a larger number of PRBs can be used for scenarios with higher traffic load.

The RAN 404 is communicatively coupled to CN 420 that includes network elements to provide various functions to support data and telecommunications services to customers/subscribers (for example, users of UE 402). The components of the CN 420 may be implemented in one physical node or separate physical nodes. In some embodiments, NFV may be utilized to virtualize any or all of the functions provided by the network elements of the CN 420 onto physical compute/storage resources in servers, switches, etc. A logical instantiation of the CN 420 may be referred to as a network slice, and a logical instantiation of a portion of the CN 420 may be referred to as a network sub-slice.

In some embodiments, the CN 420 may be an LTE CN 422, which may also be referred to as an EPC. The LTE CN 422 may include MME 424, SGW 426, SGSN 428, HSS 430, PGW 432, and PCRF 434 coupled with one another over interfaces (or "reference points") as shown. Functions of the elements of the LTE CN 422 may be briefly introduced as follows.

The MME 424 may implement mobility management functions to track a current location of the UE 402 to facilitate paging, bearer activation/deactivation, handovers, gateway selection, authentication, etc.

The SGW 426 may terminate an Si interface toward the RAN and route data packets between the RAN and the LTE CN 422. The SGW 426 may be a local mobility anchor point for inter-RAN node handovers and also may provide an anchor for inter-3GPP mobility. Other responsibilities may include lawful intercept, charging, and some policy enforcement.

The SGSN 428 may track a location of the UE 402 and perform security functions and access control. In addition, the SGSN 428 may perform inter-EPC node signaling for mobility between different RAT networks; PDN and S-GW selection as specified by MME 424; MME selection for handovers; etc. The S3 reference point between the MME 424 and the SGSN 428 may enable user and bearer information exchange for inter-3GPP access network mobility in idle/active states.

The HSS 430 may include a database for network users, including subscription-related information to support the network entities' handling of communication sessions. The HSS 430 can provide support for routing/roaming, authentication, authorization, naming/addressing resolution, location dependencies, etc. An S6a reference point between the HSS 430 and the MME 424 may enable transfer of subscription and authentication data for authenticating/authorizing user access to the LTE CN 420.

The PGW 432 may terminate an SGi interface toward a data network (DN) 436 that may include an application/content server 438. The PGW 432 may route data packets between the LTE CN 422 and the data network 436. The PGW 432 may be coupled with the SGW 426 by an S5 reference point to facilitate user plane tunneling and tunnel management. The PGW 432 may further include a node for policy enforcement and charging data collection (for example, PCEF). Additionally, the SGi reference point between the PGW 432 and the data network 436 may be an operator external public, a private PDN, or an intra-operator packet data network, for example, for provision of IMS services. The PGW 432 may be coupled with a PCRF 434 via a Gx reference point.

The PCRF 434 is the policy and charging control element of the LTE CN 422. The PCRF 434 may be communicatively coupled to the app/content server 438 to determine appropriate QoS and charging parameters for service flows. The PCRF 432 may provision associated rules into a PCEF (via Gx reference point) with appropriate TFT and QCI.

In some embodiments, the CN 420 may be a 5GC 440. The 5GC 440 may include an AUSF 442, AMF 444, SMF 446, UPF 448, NSSF 450, NEF 452, NRF 454, PCF 456, UDM 458, and AF 460 coupled with one another over interfaces (or "reference points") as shown. Functions of the elements of the 5GC 440 may be briefly introduced as follows.

The AUSF 442 may store data for authentication of UE 402 and handle authentication-related functionality. The AUSF 442 may facilitate a common authentication framework for various access types. In addition to communicating with other elements of the 5GC 440 over reference points as shown, the AUSF 442 may exhibit an Nausf service-based interface.

The AMF 444 may allow other functions of the 5GC 440 to communicate with the UE 402 and the RAN 404 and to subscribe to notifications about mobility events with respect to the UE 402. The AMF 444 may be responsible for registration management (for example, for registering UE 402), connection management, reachability management, mobility management, lawful interception of AMF-related events, and access authentication and authorization. The AMF 444 may provide transport for SM messages between the UE 402 and the SMF 446, and act as a transparent proxy for routing SM messages. AMF 444 may also provide transport for SMS messages between UE 402 and an SMSF. AMF 444 may interact with the AUSF 442 and the UE 402 to perform various security anchor and context management functions. Furthermore, AMF 444 may be a termination point of a RAN CP interface, which may include or be an N2 reference point between the RAN 404 and the AMF 444; and the AMF 444 may be a termination point of NAS (N1) signaling, and perform NAS ciphering and integrity protection. AMF 444 may also support NAS signaling with the UE 402 over an N3 IWF interface.

The SMF 446 may be responsible for SM (for example, session establishment, tunnel management between UPF 448 and AN 408); UE IP address allocation and management (including optional authorization); selection and control of UP function; configuring traffic steering at UPF 448 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 444 over N2 to AN 408; and determining SSC mode of a session. SM may refer to management of a PDU session, and a PDU session or "session" may refer to a PDU connectivity service that provides or enables the exchange of PDUs between the UE 402 and the data network 436.

The UPF 448 may act as an anchor point for intra-RAT and inter-RAT mobility, an external PDU session point of interconnect to data network 436, and a branching point to support multi-homed PDU session. The UPF 448 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 448 may include an uplink classifier to support routing traffic flows to a data network.

The NSSF 450 may select a set of network slice instances serving the UE 402. The NSSF 450 may also determine allowed NSSAI and the mapping to the subscribed S-NS-SAIs, if needed. The NSSF 450 may also determine the AMF set to be used to serve the UE 402, or a list of candidate AMFs based on a suitable configuration and possibly by querying the NRF 454. The selection of a set of network slice instances for the UE 402 may be triggered by the AMF 444 with which the UE 402 is registered by interacting with the NSSF 450, which may lead to a change of AMF. The NSSF 450 may interact with the AMF 444 via an N22 reference point; and may communicate with another NSSF in a visited network via an N31 reference point (not shown). Additionally, the NSSF 450 may exhibit an Nnssf service-based interface.

The NEF 452 may securely expose services and capabilities provided by 3GPP network functions for third party, internal exposure/re-exposure, AFs (e.g., AF 460), edge computing or fog computing systems, etc. In such embodiments, the NEF 452 may authenticate, authorize, or throttle the AFs. NEF 452 may also translate information exchanged with the AF 460 and information exchanged with internal network functions. For example, the NEF 452 may translate between an AF-Service-Identifier and an internal 5GC information. NEF 452 may also receive information from other NFs based on exposed capabilities of other NFs. This information may be stored at the NEF 452 as structured data, or at a data storage NF using standardized interfaces. The stored information can then be re-exposed by the NEF 452 to other NFs and AFs, or used for other purposes such as analytics. Additionally, the NEF 452 may exhibit an Nnef service-based interface.

The NRF 454 may support service discovery functions, receive NF discovery requests from NF instances, and provide the information of the discovered NF instances to the NF instances. NRF 454 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 454 may exhibit the Nnrf service-based interface.

The PCF 456 may provide policy rules to control plane functions to enforce them, and may also support unified policy framework to govern network behavior. The PCF 456 may also implement a front end to access subscription information relevant for policy decisions in a UDR of the UDM 458. In addition to communicating with functions over reference points as shown, the PCF 456 exhibit an Npcf service-based interface.

The UDM 458 may handle subscription-related information to support the network entities' handling of communication sessions, and may store subscription data of UE 402. For example, subscription data may be communicated via an N8 reference point between the UDM 458 and the AMF 444. The UDM 458 may include two parts, an application front end and a UDR. The UDR may store subscription data and policy data for the UDM 458 and the PCF 456, and/or structured data for exposure and application data (including PFDs for application detection, application request information for multiple UEs 402) for the NEF 452. The Nudr service-based interface may be exhibited by the UDR 221 to allow the UDM 458, PCF 456, and NEF 452 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 458 may exhibit the Nudm service-based interface.

The AF 460 may provide application influence on traffic routing, provide access to NEF, and interact with the policy framework for policy control.

In some embodiments, the 5GC 440 may enable edge computing by selecting operator/$3^{rd}$ party services to be geographically close to a point that the UE 402 is attached to the network. This may reduce latency and load on the network. To provide edge-computing implementations, the 5GC 440 may select a UPF 448 close to the UE 402 and execute traffic steering from the UPF 448 to data network 436 via the N6 interface. This may be based on the UE subscription data, UE location, and information provided by the AF 460. In this way, the AF 460 may influence UPF (re)selection and traffic routing. Based on operator deployment, when AF 460 is considered to be a trusted entity, the network operator may permit AF 460 to interact directly with relevant NFs. Additionally, the AF 460 may exhibit an Naf service-based interface.

The data network 436 may represent various network operator services, Internet access, or third party services that may be provided by one or more servers including, for example, application/content server 438.

FIG. 5 schematically illustrates a wireless network 500 in accordance with various embodiments. The wireless network 500 may include a UE 502 in wireless communication with an AN 504. The UE 502 and AN 504 may be similar to, and substantially interchangeable with, like-named components described elsewhere herein.

The UE 502 may be communicatively coupled with the AN 504 via connection 506. The connection 506 is illustrated as an air interface to enable communicative coupling, and can be consistent with cellular communications protocols such as an LTE protocol or a 5G NR protocol operating at mmWave or sub-6 GHz frequencies.

The UE 502 may include a host platform 508 coupled with a modem platform 510. The host platform 508 may include application processing circuitry 512, which may be coupled with protocol processing circuitry 514 of the modem platform 510. The application processing circuitry 512 may run various applications for the UE 502 that source/sink application data. The application processing circuitry 512 may further implement one or more layer operations to transmit/receive application data to/from a data network. These layer operations may include transport (for example UDP) and Internet (for example, IP) operations The protocol processing circuitry 514 may implement one or more of layer operations to facilitate transmission or reception of data over the connection 506. The layer operations implemented by the protocol processing circuitry 514 may include, for example, MAC, RLC, PDCP, RRC and NAS operations.

The modem platform 510 may further include digital baseband circuitry 516 that may implement one or more layer operations that are "below" layer operations performed by the protocol processing circuitry 514 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 510 may further include transmit circuitry 518, receive circuitry 520, RF circuitry 522, and RF front end (RFFE) 524, which may include or connect to one or more antenna panels 526. Briefly, the transmit circuitry 518 may include a digital-to-analog converter, mixer, intermediate frequency (IF) components, etc.; the receive circuitry 520 may include an analog-to-digital converter, mixer, IF components, etc.; the RF circuitry 522 may include a low-noise amplifier, a power amplifier, power tracking components, etc.; RFFE 524 may include filters (for example, surface/bulk acoustic wave filters), switches, antenna tuners, beamforming components (for example, phase-array antenna components), etc. The selection and arrangement of the components of the transmit circuitry 518, receive circuitry 520, RF circuitry 522, RFFE 524, and antenna panels 526 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 514 may include one or more instances of control circuitry (not shown) to provide control functions for the transmit/receive components.

A UE reception may be established by and via the antenna panels 526, RFFE 524, RF circuitry 522, receive circuitry 520, digital baseband circuitry 516, and protocol processing circuitry 514. In some embodiments, the antenna panels 526 may receive a transmission from the AN 504 by receive-beamforming signals received by a plurality of antennas/antenna elements of the one or more antenna panels 526.

A UE transmission may be established by and via the protocol processing circuitry 514, digital baseband circuitry 516, transmit circuitry 518, RF circuitry 522, RFFE 524, and antenna panels 526. In some embodiments, the transmit components of the UE 504 may apply a spatial filter to the data to be transmitted to form a transmit beam emitted by the antenna elements of the antenna panels 526.

Similar to the UE 502, the AN 504 may include a host platform 528 coupled with a modem platform 530. The host platform 528 may include application processing circuitry 532 coupled with protocol processing circuitry 534 of the modem platform 530. The modem platform may further include digital baseband circuitry 536, transmit circuitry 538, receive circuitry 540, RF circuitry 542, RFFE circuitry 544, and antenna panels 546. The components of the AN 504 may be similar to and substantially interchangeable with like-named components of the UE 502. In addition to performing data transmission/reception as described above, the components of the AN 508 may perform various logical functions that include, for example, RNC functions such as radio bearer management, uplink and downlink dynamic radio resource management, and data packet scheduling.

FIG. 6 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640 or other interface circuitry. For embodiments where node virtualization (e.g., NFV) is utilized, a hypervisor 602 may be executed to provide an execution environment for one or more network slices/subslices to utilize the hardware resources 600.

The processors 610 may include, for example, a processor 612 and a processor 614. The processors 610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 620 may include main memory, disk storage, or any suitable combination thereof. The memory/storage devices 620 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 630 may include interconnection or network interface controllers, components, or other suitable devices to communicate with one or more peripheral devices 604 or one or more databases 606 or other network elements via a network 608. For example, the communication resources 630 may include wired communication components (e.g., for coupling via USB, Ethernet, etc.), cellular communication components, NFC components, Bluetooth® (or Bluetooth® Low Energy) components, Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Example Procedures

Figure 7:
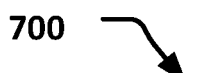
FIG. 7 depicts an example procedure for practicing the various embodiments discussed herein.
Figure 7:
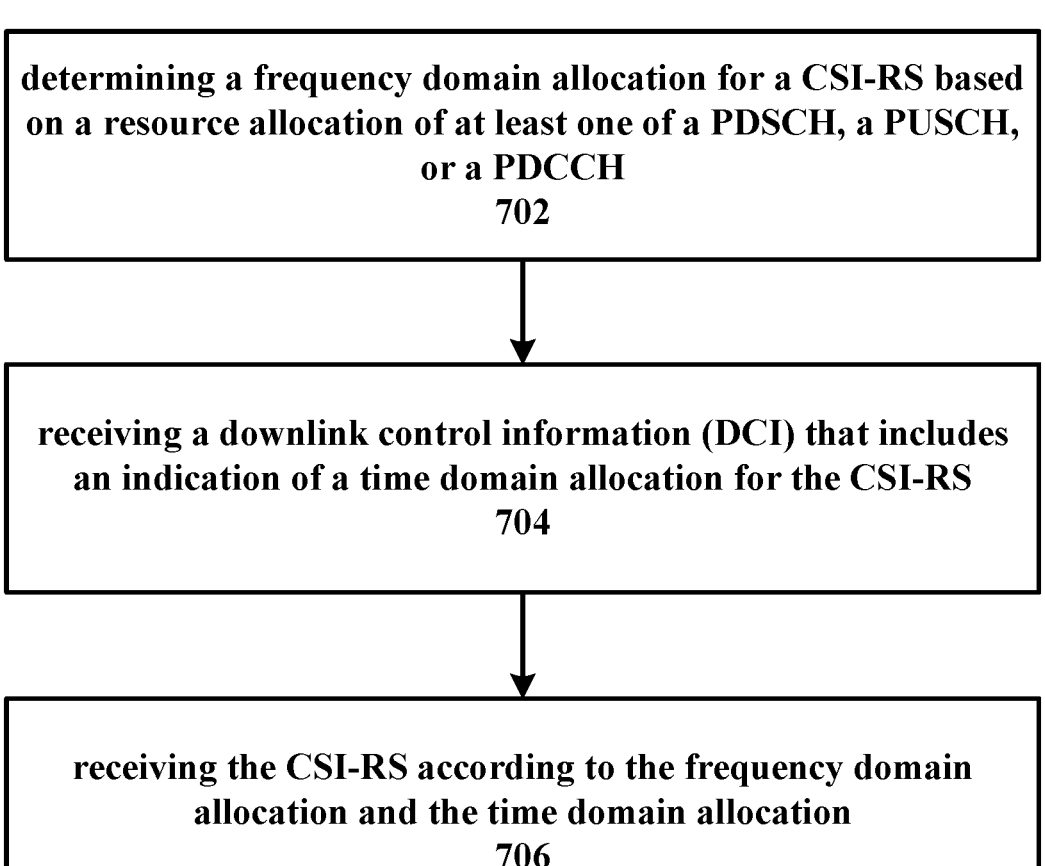

In some embodiments, the electronic device(s), network(s), system(s), chip(s) or component(s), or portions or implementations thereof, of FIGS. 4-6, or some other figure herein, may be configured to perform one or more processes, techniques, or methods as described herein, or portions thereof. One such process 700 is depicted in FIG. 7. For example, the process 700 may include, at 702, determining a frequency domain allocation for a CSI-RS based on a resource allocation of at least one of a PDSCH, a PUSCH, or a PDCCH. At 704, the process 700 may further include receiving a downlink control information (DCI) that includes an indication of a time domain allocation for the CSI-RS. At 706, the process 700 may further include receiving the CSI-RS according to the frequency domain allocation and the time domain allocation.

In one example, the DCI is to schedule the PDSCH, and wherein the frequency domain allocation for the CSI-RS is the resource allocation of the PDSCH in the frequency domain. In another example, the DCI is to schedule the PUSCH, and wherein the frequency domain allocation for the CSI-RS is the resource allocation of the PUSCH in the frequency domain. In another example, the DCI is included in the PDCCH, wherein the PDCCH does not schedule a PDSCH or PUSCH, and wherein the frequency domain allocation for the CSI-RS is the resource allocation of the PDCCH in the frequency domain. In another example, the frequency domain allocation is a union of two or more of the resource allocations of the PDSCH, the PUSCH, and the PDCCH in the frequency domain.

FIG. 8 illustrates another process 800 in accordance with various embodiments. The process 800 may be performed by a gNB or a portion thereof. At 802, the process 800 may include encoding a DCI for transmission to a UE in a PDCCH, wherein the DCI includes an indication of a time domain allocation for a CSI-RS. At 804, the process 800 may further include determining a frequency domain allocation for the CSI-RS based on a resource allocation of at least one of a PDSCH, a PUSCH, or the PDCCH. At 806, the process 800 may further include encoding the CSI-RS for transmission to the UE according to the frequency domain allocation and the time domain allocation.

In one example, the DCI is to schedule the PDSCH, and wherein the frequency domain allocation for the CSI-RS is the resource allocation of the PDSCH in the frequency domain. In another example, the DCI is to schedule the PUSCH, and wherein the frequency domain allocation for the CSI-RS is the resource allocation of the PUSCH in the frequency domain. In another example, the DCI is included in the PDCCH, wherein the PDCCH does not schedule a PDSCH or PUSCH, and wherein the frequency domain allocation for the CSI-RS is the resource allocation of the PDCCH in the frequency domain. In another example, the frequency domain allocation is a union of two or more of the resource allocations of the PDSCH, the PUSCH, and the PDCCH in the frequency domain.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example A1 may include one or more non-transitory computer-readable media (NTCRM) having instructions, stored thereon, that when executed cause a user equipment (UE) to: determine a frequency domain allocation for a channel state information reference signal (CSI-RS) based on a resource allocation of at least one of a physical downlink shared channel (PDSCH), a physical uplink shared channel (PUSCH), or a physical downlink control channel (PDCCH); receive a downlink control information (DCI) that includes an indication of a time domain allocation for the CSI-RS; and receive the CSI-RS according to the frequency domain allocation and the time domain allocation.

Example A2 may include the one or more NTCRM of example A1 or some other example herein, wherein the DCI is to schedule the PDSCH, and wherein the frequency domain allocation for the CSI-RS is the resource allocation of the PDSCH in the frequency domain.

Example A3 may include the one or more NTCRM of example A1 or some other example herein, wherein the DCI is to schedule the PUSCH, and wherein the frequency domain allocation for the CSI-RS is the resource allocation of the PUSCH in the frequency domain.

Example A4 may include the one or more NTCRM of example A1 or some other example herein, wherein the DCI is included in the PDCCH, wherein the PDCCH does not schedule a PDSCH or PUSCH, and wherein the frequency domain allocation for the CSI-RS is the resource allocation of the PDCCH in the frequency domain.

Example A5 may include the one or more NTCRM of example A1 or some other example herein, wherein the frequency domain allocation is a union of two or more of the resource allocations of the PDSCH, the PUSCH, and the PDCCH in the frequency domain.

Example A6 may include the one or more NTCRM of example A1 or some other example herein, wherein the instructions, when executed, are further to cause the UE to: determine that a target frequency domain allocation does not support a CSI-RS sequence size of the CSI-RS; and determine the frequency domain allocation of the CSI-RS as a closest frequency domain resource allocation within the target frequency domain allocation that is supported by the CSI-RS sequence size.

Example A7 may include the one or more NTCRM of example A1 or some other example herein, wherein the instructions, when executed, are further to cause the UE to: determine that a target frequency domain allocation does not support a CSI-RS sequence size of the CSI-RS; and determine the frequency domain allocation of the CSI-RS as a closest frequency domain resource allocation that overlaps with the target frequency domain allocation and is supported by the CSI-RS sequence size.

Example A8 may include the one or more NTCRM of any one of examples A1-A7 or some other example herein, wherein the CSI-RS is received within the resource allocation for the PDSCH, and wherein the instructions, when executed, are further to cause the UE to receive a demodulation reference signal (DM-RS) directly after the CSI-RS.

Example A9 may include the one or more NTCRM of example A8 or some other example herein, wherein the DM-RS is received before a subsequent portion of the PDSCH.

Example A10 may include the one or more NTCRM of example A8 or some other example herein, wherein the DM-RS is received at an end of a downlink portion of a time-division duplexing (TDD) period or at an end of the resource allocation for the PDSCH.

Example A11 may include the one or more NTCRM of any one of examples A1-A7 or some other example herein, wherein the CSI-RS is a zero-power CSI-RS, and wherein the DCI includes an offset value to indicate the time domain allocation of the CSI-RS.

Example A12 may include one or more non-transitory computer-readable media (NTCRM) having instructions, stored thereon, that when executed cause a next generation Node B (gNB) to: encode a downlink control information (DCI) for transmission to a user equipment (UE) in a physical downlink control channel (PDCCH), wherein the DCI includes an indication of a time domain allocation for a channel state information reference signal (CSI-RS); determine a frequency domain allocation for the CSI-RS based on a resource allocation of at least one of a physical downlink shared channel (PDSCH), a physical uplink shared channel (PUSCH), or the PDCCH; and encode the CSI-RS for transmission to the UE according to the frequency domain allocation and the time domain allocation.

Example A13 may include the one or more NTCRM of example A12 or some other example herein, wherein the DCI is to schedule the PDSCH, and wherein the frequency domain allocation for the CSI-RS is the resource allocation of the PDSCH in the frequency domain; or wherein the DCI is to schedule the PUSCH, and wherein the frequency domain allocation for the CSI-RS is the resource allocation of the PUSCH in the frequency domain; or wherein the DCI is included in the PDCCH, wherein the PDCCH does not schedule a PDSCH or PUSCH, and wherein the frequency domain allocation for the CSI-RS is the resource allocation of the PDCCH in the frequency domain.

Example A14 may include the one or more NTCRM of example A12 or some other example herein, wherein the frequency domain allocation is a union of two or more of the resource allocations of the PDSCH, the PUSCH, and the PDCCH in the frequency domain.

Example A15 may include the one or more NTCRM of example A12 or some other example herein, wherein the instructions, when executed, are further to cause the gNB to: determine that a target frequency domain allocation does not support a CSI-RS sequence size of the CSI-RS; and determine the frequency domain allocation of the CSI-RS based on the target frequency domain allocation and the CSI-RS sequence size.

Example A16 may include the one or more NTCRM of example A12 or some other example herein, wherein the CSI-RS is a zero-power CSI-RS, and wherein the DCI includes an offset value to indicate the time domain allocation of the CSI-RS.

Example A17 may include the one or more NTCRM of any one of examples A12-A16 or some other example herein, wherein the CSI-RS is transmitted within the resource allocation for the PDSCH, and wherein the instructions, when executed, are further to cause the gNB to encode a demodulation reference signal (DM-RS) after the CSI-RS and before any subsequent portion of the PDSCH.

Example A18 may include an apparatus to be implemented in a user equipment (UE), the apparatus comprising: memory to store a resource allocation for a physical downlink shared channel (PDSCH); and processor circuitry coupled to the memory. The processor circuitry is to: perform a beam measurement on a channel state information reference signal (CSI-RS) received within the resource allocation; and perform a channel estimation on a demodulation reference signal (DM-RS) received directly after the CSI-RS.

Example A19 may include the apparatus of example A18 or some other example herein, wherein the DM-RS is received before any subsequent portion of the PDSCH.

Example A20 may include the apparatus of example A18 or some other example herein, wherein the DM-RS is received at an end of a downlink portion of a time-division duplexing (TDD) period or at an end of the resource allocation for the PDSCH.

Example A21 may include the apparatus of any one of examples A18-A20 or some other example herein, wherein the processor circuitry is further to decode a downlink control information (DCI) that includes an indication of a time domain allocation for the CSI-RS, wherein a frequency domain allocation of the CSI-RS is the same as the resource allocation of the PDSCH in the frequency domain.

Example B1 may include a method of channel state information reference signal (CSI-RS) transmission, wherein the method includes:
indication of frequency domain allocation according to allocation of PDSCH, PUSCH and PDCCH;
indication of time domain allocation according to DCI signalling; and
transmission of CSI-RS according to the indication.

Example B2 may include the method of example B1 or some other example herein, wherein frequency domain allocation is frequency domain allocation of PDSCH.

Example B3 may include the method of example B1 or some other example herein, wherein frequency domain allocation is frequency domain allocation of PUSCH.

Example B4 may include the method of example B1 or some other example herein, wherein frequency domain allocation is frequency domain allocation of PDCCH.

Example B5 may include the method of examples B2, B3, B4 or some other example herein, wherein frequency domain allocation is union of corresponding allocations.

Example B6 may include the method of examples B2, B3, B4 or some other example herein, wherein frequency domain allocation for CSI-RS is pre-determined higher layer configured value.

Example B7 may include the method of examples B2, B3, B4 or some other example herein, wherein frequency domain allocation for CSI-RS corresponds to SS/PBCH.

Example B8 may include the method of example B1 or some other example herein, wherein CSI-RS indication corresponds to zero power CSI-RS, where PDSCH is not transmitted.

Example B9 may include the method of example B1 or some other example herein, wherein zero power CSI-RS is indicated in the next PDCCH transmission where pre-empted code block groups are indicated by HARQ feedback fields.

Example B10 may include the method of example B1 or some other example herein, wherein DM-RS is transmitted in PDSCH after CSI-RS transmission.

Example B11 may include a method of a user equipment (UE), the method comprising: determining a frequency domain allocation for a channel state information reference signal (CSI-RS) based on a resource allocation of at least one of a PDSCH, a PUSCH, or a PDCCH; receiving downlink control information (DCI) that includes an indication of a time domain allocation for the CSI-RS; and receiving the CSI-RS according to the frequency domain allocation and the time domain allocation.

Example B12 may include the method of example B11 or some other example herein, wherein frequency domain allocation is the resource allocation of the PDSCH in the frequency domain.

Example B13 may include the method of example B11 or some other example herein, wherein the frequency domain allocation is the resource allocation of the PUSCH in the frequency domain.

Example B14 may include the method of example B11 or some other example herein, wherein frequency domain allocation is the resource allocation of the PDCCH in the frequency domain.

Example B15 may include the method of examples B11 or some other example herein, wherein frequency domain allocation is a union of two or more of the resource allocations in the frequency domain.

Example Z01 may include an apparatus comprising means to perform one or more elements of a method described in or related to any of examples A1-A21, B1-B15, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A21, B1-B15, or any other method or process described herein.

Example Z03 may include an apparatus comprising logic, modules, or circuitry to perform one or more elements of a method described in or related to any of examples A1-A21, B1-B15, or any other method or process described herein.

Example Z04 may include a method, technique, or process as described in or related to any of examples A1-A21, B1-B15, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A21, B1-B15, or portions thereof.

Example Z06 may include a signal as described in or related to any of examples A1-A21, B1-B15, or portions or parts thereof.

Example Z07 may include a datagram, packet, frame, segment, protocol data unit (PDU), or message as described in or related to any of examples A1-A21, B1-B15, or portions or parts thereof, or otherwise described in the present disclosure.

Example Z08 may include a signal encoded with data as described in or related to any of examples A1-A21, B1-B15, or portions or parts thereof, or otherwise described in the present disclosure.

Example Z09 may include a signal encoded with a datagram, packet, frame, segment, protocol data unit (PDU), or message as described in or related to any of examples A1-A21, B1-B15, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A21, B1-B15, or portions thereof.

Example Z11 may include a computer program comprising instructions, wherein execution of the program by a processing element is to cause the processing element to carry out the method, techniques, or process as described in or related to any of examples A1-A21, B1-B15, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

3GPP Third Generation Partnership Project
4G Fourth Generation
5G Fifth Generation
5GC 5G Core network
AC Application Client
ACK Acknowledgement
ACID Application Client Identification
AF Application Function
AM Acknowledged Mode
AMBR Aggregate Maximum Bit Rate
AMF Access and Mobility Management Function
AN Access Network
ANR Automatic Neighbour Relation
AOA Angle of Arrival
AP Application Protocol, Antenna Port, Access Point
API Application Programming Interface
APN Access Point Name
ARP Allocation and Retention Priority
ARQ Automatic Repeat Request
AS Access Stratum
ASP Application Service Provider
ASN.1 Abstract Syntax Notation One
AUSF Authentication Server Function
AWGN Additive White Gaussian Noise
BAP Backhaul Adaptation Protocol
BCH Broadcast Channel
BER Bit Error Ratio
BFD Beam Failure Detection
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CGF Charging Gateway Function
CHF Charging Function
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf -continued CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource
Indicator
C-RNTI Cell RNTI
CS Circuit Switched
CSCF call session control function
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTF Charging Trigger Function
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DNN Data Network Name
DNAI Data Network Access Identifier
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
ECCA extended clear channel assessment, extended CCA
ECCE Enhanced Control Channel Element, Enhanced CCE
ED Energy Detection
EDGE Enhanced Datarates for GSM Evolution (GSM Evolution)
EAS Edge Application Server
EASID Edge Application Server Identification
ECS Edge Configuration Server
ECSP Edge Computing Service Provider
EDN Edge Data Network
EEC Edge Enabler Client
EECID Edge Enabler Client Identification
EES Edge Enabler Setver
EESID Edge Enabler Server Identification
EHE Edge Hosting Environment
EGMF Exposure Governance Management Function
EGPRS Enhanced GPRS
EIR Equipment Identity Register
eLAA enhanced Licensed Assisted Access, enhanced LAA
EM Element Manager
eMBB Enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card -continued E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signaling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
FQDN Fully Qualified Domain Name
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema (Engl.:
Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GPSI Generic Public Subscription Identifier
GSM Global System for Mobile Communications, Groupe Spécial Mobile
GTP GPRS Tunneling Protocol
GTP-UGPRS Tunnelling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO Handover
HFN HyperFrame Number
HHO Hard Handover
HLR Home Location Register
HN Home Network
HO Handover
HPLMN Home Public Land Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Protocol Secure (https is http/1.1 over SSL,
i.e. port 443)
I-Block Information Block
ICCID Integrated Circuit Card Identification
IAB Integrated Access and Backhaul
ICIC Inter-Cell Interference Coordination
ID Identity, identifier
IDFT Inverse Discrete Fourier Transform
IE Information element
IBE In-Band Emission
IEEE Institute of Electrical and Electronics Engineers
IEI Information Element Identifier
IEIDL Information Element Identifier Data Length
IETF Internet Engineering Task Force
IF Infrastructure
IIOT Industrial Internet of Things
IM Interference Measurement, Intermodulation, IP Multimedia
IMC IMS Credentials
IMEI International Mobile Equipment Identity
IMGI International mobile group identity
IMPI IP Multimedia Private Identity -continued IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IS In Sync
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN Constraint length of the convolutional
code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LADN Local Area Data Network
LBT Listen Before Talk
LCM LifeCycle Management
LCR Low Chip Rate
LCS Location Services
LCID Logical Channel ID
LI Layer Indicator
LLC Logical Link Control, Low Layer Compatibility
LMF Location Management Function
LOS Line of Sight
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)
MAC Message authentication code (security/encryption context)
MAC-A MAC used for authentication and key agreement (TSG T WG3
context)
MAC-I MAC used for data integrity of signalling messages (TSG T WG3
context)
MANO Management and Orchestration
MBMS Multimedia Broadcast and Multicast Service
MBSFN Multimedia Broadcast multicast service Single Frequency
Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
MM Mobility Management -continued MME Mobility Management Entity
MN Master Node
MNO Mobile Network Operator
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information, MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTCmassive MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non- Access Stratum layer
NCT Network Connectivity Topology
NC-JT Non-Coherent Joint Transmission
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAI Network Slice Selection Assistance Information
S-NNSAI Single-NSSAI
NSSF Network Slice Selection Function
NW Network
NWUS Narrowband wake-up signal, Narrowband WUS
NZP Non-Zero Power
O&M Operation and Maintenance
ODU2 Optical channel Data Unit - type 2
OFDM Orthogonal Frequency Division Multiplexing
OFDMA Orthogonal Frequency Division Multiple Access
OOB Out-of-band
OOS Out of Sync
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
P-CSCF Proxy CSCF
PCell Primary Cell -continued PCI Physical Cell ID, Physical Cell Identity
PCEF Policy and Charging Enforcement Function
PCF Policy Control Function
PCRF Policy Control and Charging Rules Function
PDCP Packet Data Convergence Protocol, Packet Data Convergence
Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PRR Packet Reception Radio
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
RIV Resource indicator value
RL Radio Link
RLC Radio Link Control, Radio Link Control layer
RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node -continued RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-CSCF serving CSCF
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SCEF Service Capability Exposure Function
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation
Protocol layer
SDL Supplementary Downlink
SDNF Structured Data Storage Network Function
SDP Session Description Protocol
SDSF Structured Data Storage Function
SDT Small Data Transmission
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block
SSID Service Set Identifier -continued SS/PBCH Block SSBRI SS/PBCH Block Resource Indicator,
Synchronization Signal Block Resource Indicator
SSC Session and Service Continuity
SS-RSRP Synchronization Signal based Reference Signal Received Power
SS-RSRQ Synchronization Signal based Reference Signal Received
Quality
SS-SINR Synchronization Signal based Signal to Noise and Interference
Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAI Tracking Area Identity
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastruction
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over- Internet Protocol
VPLMN Visited Public Land Mobile Network
VPN Virtual Private Network -continued VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane
X2-U X2-User plane
XML eXtensible Markup Language
XRES EXpected user RESponse
XOR eXclusive OR
ZC Zadoff-Chu
ZP Zero Power Terminology For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed configure a user equipment (UE) to:

determine a frequency domain allocation for a channel state information reference signal (CSI-RS) comprising determining the frequency domain allocation as a union of resource allocations of the PDSCH and the PUSCH;

receive a downlink control information (DCI) that includes an indication of a time domain allocation for the CSI-RS; and receive the CSI-RS according to the frequency domain allocation and the time domain allocation.

2. The one or more NTCRM of claim 1, wherein the DCI is to schedule the PDSCH, and wherein the frequency domain allocation for the CSI-RS is the resource allocation of the PDSCH in the frequency domain.

3. The one or more NTCRM of claim 1, wherein the DCI is to schedule the PUSCH, and wherein the frequency domain allocation for the CSI-RS is the resource allocation of the PUSCH in the frequency domain.

4. The one or more NTCRM of claim 1, wherein the DCI is included in the PDCCH, wherein the PDCCH does not schedule a PDSCH or PUSCH, and wherein the frequency domain allocation for the CSI-RS is the resource allocation of the PDCCH in the frequency domain.

5. The one or more NTCRM of claim 1, wherein the frequency domain allocation is a union of two or more of the resource allocations of the PDSCH, the PUSCH, and the PDCCH in the frequency domain.

6. The one or more NTCRM of claim 1, wherein the instructions, when executed, further configure the UE to:

determine that a target frequency domain allocation does not support a CSI-RS sequence size of the CSI-RS; and determine the frequency domain allocation of the CSI-RS as a closest frequency domain resource allocation within the target frequency domain allocation that is supported by the CSI-RS sequence size.

7. The one or more NTCRM of claim 1, wherein the instructions, when executed, further configure the UE to:

determine that a target frequency domain allocation does not support a CSI-RS sequence size of the CSI-RS; and determine the frequency domain allocation of the CSI-RS as a closest frequency domain resource allocation that overlaps with the target frequency domain allocation and is supported by the CSI-RS sequence size.

8. The one or more NTCRM of claim 1, wherein the CSI-RS is received within the resource allocation for the PDSCH, and wherein the instructions, when executed, are further to cause the UE to receive a demodulation reference signal (DM-RS) directly after the CSI-RS.

9. The one or more NTCRM of claim 8, wherein the DM-RS is received before a subsequent portion of the PDSCH; or wherein the DM-RS is received at an end of a downlink portion of a time-division duplexing (TDD) period or at an end of the resource allocation for the PDSCH.

10. The one or more NTCRM of claim 1, wherein the CSI-RS is a zero-power CSI-RS, and wherein the DCI includes an offset value to indicate the time domain allocation of the CSI-RS.

11. One or more non-transitory computer-readable media (NTCRM) having instructions, stored thereon, that when executed configure a next generation Node B (gNB) to:

encode a downlink control information (DCI) for transmission to a user equipment (UE) in a physical downlink control channel (PDCCH), wherein the DCI includes an indication of a time domain allocation for a channel state information reference signal (CSI-RS);

determine a frequency domain allocation for the CSI-RS comprising determining the frequency domain allocation as a union of resource allocations of the PDSCH and the PUSCH; and encode the CSI-RS for transmission to the UE according to the frequency domain allocation and the time domain allocation.

12. The one or more NTCRM of claim 11, wherein the DCI is to schedule the PDSCH, and wherein the frequency domain allocation for the CSI-RS is the resource allocation of the PDSCH in the frequency domain; or wherein the DCI is to schedule the PUSCH, and wherein the frequency domain allocation for the CSI-RS is the resource allocation of the PUSCH in the frequency domain; or wherein the DCI is included in the PDCCH, wherein the PDCCH does not schedule a PDSCH or PUSCH, and wherein the frequency domain allocation for the CSI-RS is the resource allocation of the PDCCH in the frequency domain.

13. The one or more NTCRM of claim 11, wherein the frequency domain allocation is a union of two or more of the resource allocations of the PDSCH, the PUSCH, and the PDCCH in the frequency domain.

14. The one or more NTCRM of claim 11, wherein the instructions, when executed, further configure the gNB to:

determine that a target frequency domain allocation does not support a CSI-RS sequence size of the CSI-RS; and determine the frequency domain allocation of the CSI-RS based on the target frequency domain allocation and the CSI-RS sequence size.

15. The one or more NTCRM of claim 11, wherein the CSI-RS is a zero-power CSI-RS, and wherein the DCI includes an offset value to indicate the time domain allocation of the CSI-RS.

16. The one or more NTCRM of claim 11, wherein the CSI-RS is transmitted within the resource allocation for the PDSCH, and wherein the instructions, when executed, further configure the gNB to encode a demodulation reference signal (DM-RS) after the CSI-RS and before any subsequent portion of the PDSCH.

17. An apparatus to be implemented in a user equipment (UE), the apparatus comprising:

memory to store a resource allocation for a physical downlink shared channel (PDSCH); and processor circuitry coupled to the memory, the processor circuitry to:

perform a beam measurement on a channel state information reference signal (CSI-RS) received within a frequency domain allocation determined as a union of resource allocations of the PDSCH and the PUSCH; and perform a channel estimation on a demodulation reference signal (DM-RS) received directly after the CSI-RS.

18. The apparatus of claim 17, wherein the DM-RS is received before any subsequent portion of the PDSCH.

19. The apparatus of claim 17, wherein the DM-RS is received at an end of a downlink portion of a time-division duplexing (TDD) period or at an end of the resource allocation for the PDSCH.

20. The apparatus of claim 17, wherein the processor circuitry is further to decode a downlink control information (DCI) that includes an indication of a time domain allocation for the CSI-RS, wherein a frequency domain allocation of the CSI-RS is the same as the resource allocation of the PDSCH in the frequency domain.

\* \* \* \* \*